United States Patent
Satish

(10) Patent No.: US 7,975,010 B1
(45) Date of Patent: Jul. 5, 2011

(54) COUNTERING SPAM THROUGH ADDRESS COMPARISON

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1005 days.

(21) Appl. No.: 11/088,348

(22) Filed: Mar. 23, 2005

(51) Int. Cl.
*G06F 15/16* (2006.01)

(52) U.S. Cl. .......... 709/206; 709/205; 709/207; 726/11; 726/13; 726/22; 726/26; 707/999.01; 707/999.107

(58) Field of Classification Search .......... 709/205–207; 726/11, 13, 22, 26; 707/10, 104.1, 999.01, 707/999.107
See application file for complete search history.

(56) References Cited

U.S. PATENT DOCUMENTS

| | | | |
|---|---|---|---|
| 5,999,932 A * | 12/1999 | Paul | 707/10 |
| 6,167,434 A * | 12/2000 | Pang | 709/206 |
| 6,249,807 B1 | 6/2001 | Shaw et al. | |
| 6,282,565 B1 | 8/2001 | Shaw et al. | |
| 6,289,416 B1 | 9/2001 | Fukushima et al. | |
| 6,321,267 B1 * | 11/2001 | Donaldson | 709/229 |
| 6,324,569 B1 | 11/2001 | Ogilvie et al. | |
| 6,351,764 B1 * | 2/2002 | Voticky et al. | 709/207 |
| 6,487,586 B2 | 11/2002 | Ogilvie et al. | |
| 6,493,007 B1 | 12/2002 | Pang | |
| 6,546,416 B1 | 4/2003 | Kirsch | |
| 6,640,301 B1 | 10/2003 | Ng | |
| 6,643,685 B1 | 11/2003 | Millard | |
| 6,650,890 B1 | 11/2003 | Irlam et al. | |
| 6,654,787 B1 * | 11/2003 | Aronson et al. | 709/206 |
| 6,654,789 B1 * | 11/2003 | Bliss et al. | 709/206 |
| 6,687,740 B1 | 2/2004 | Gough | |
| 6,691,156 B1 | 2/2004 | Drummond et al. | |
| 6,697,942 B1 | 2/2004 | L'Heureux | |
| 6,701,347 B1 | 3/2004 | Ogilvie | |
| 6,711,608 B1 | 3/2004 | Ogilvie | |
| 6,732,157 B1 * | 5/2004 | Gordon et al. | 709/206 |
| 6,757,713 B1 | 6/2004 | Ogilvie et al. | |
| 6,757,830 B1 | 6/2004 | Tarbotton et al. | |
| 6,779,021 B1 * | 8/2004 | Bates et al. | 709/206 |
| 7,051,077 B2 * | 5/2006 | Lin | 709/207 |
| 7,089,241 B1 * | 8/2006 | Alspector et al. | 707/7 |
| 7,249,175 B1 * | 7/2007 | Donaldson | 709/225 |
| 7,263,607 B2 * | 8/2007 | Ingerman et al. | 713/150 |

(Continued)

OTHER PUBLICATIONS

CAUCE.org web pages [online] Coalition Against Unsolicited Commercial Email [retrieved Mar. 17, 2003] Retrieved from the Internet: <URL: http://www.cauce.org/about/problem.shtml> U.S.A.

(Continued)

*Primary Examiner* — Kamal B Divecha
*Assistant Examiner* — Saket K Daftuar
(74) *Attorney, Agent, or Firm* — Fenwick & West LLP

(57) ABSTRACT

Computer implemented methods, apparati, and computer readable media for determining whether an electronic message (30) is likely to contain spam. A method embodiment of the present invention comprises the steps of comparing (11) addresses associated with the electronic message (30) with addresses in an address book (21) of a recipient (20) of the electronic message (30); counting (12) instances for which an address associated with the electronic message (30) matches an address in the address book (21); and determining (13) whether spam is likely present in the electronic message (30) by calculating whether a pre-selected condition (70) is satisfied, said pre-selected condition (70) being based upon a count of said matches and at least one predetermined threshold (80).

15 Claims, 2 Drawing Sheets

U.S. PATENT DOCUMENTS

| | | | |
|---|---|---|---|
| 7,272,853 B2 * | 9/2007 | Goodman et al. | 726/13 |
| 7,287,059 B2 * | 10/2007 | Shono | 709/206 |
| 7,293,065 B2 * | 11/2007 | Banister et al. | 709/206 |
| 7,516,182 B2 * | 4/2009 | Goldman | 709/206 |
| 2002/0087641 A1 | 7/2002 | Levosky | |
| 2002/0138581 A1 | 9/2002 | MacIntosh et al. | |
| 2003/0149726 A1 | 8/2003 | Spear | |
| 2003/0167311 A1 | 9/2003 | Kirsch | |
| 2003/0191969 A1 | 10/2003 | Katsikas | |
| 2003/0200334 A1 | 10/2003 | Grynberg | |
| 2003/0220978 A1 | 11/2003 | Rhodes | |
| 2003/0229672 A1 | 12/2003 | Kohn | |
| 2003/0233415 A1 | 12/2003 | Beyda | |
| 2004/0003283 A1 | 1/2004 | Goodman et al. | |
| 2004/0024823 A1 * | 2/2004 | Del Monte | 709/206 |
| 2004/0054887 A1 | 3/2004 | Paulsen et al. | |
| 2004/0064734 A1 | 4/2004 | Ehrlich | |
| 2004/0068534 A1 | 4/2004 | Angermayr et al. | |
| 2004/0073617 A1 | 4/2004 | Milliken et al. | |
| 2004/0093383 A1 | 5/2004 | Huang et al. | |
| 2004/0093384 A1 | 5/2004 | Shipp | |
| 2004/0111480 A1 | 6/2004 | Yue | |
| 2004/0148358 A1 | 7/2004 | Singh et al. | |
| 2004/0205173 A1 | 10/2004 | Hall | |

OTHER PUBLICATIONS

Outlook.spambully.com web pages [online] Spam Bully [retrieved Jan. 16, 2003] Copyright 2002, Retrieved from the Internet <URL: http://outlook.spambully.com/about.php>.

NBEC/NWOCA Anti-Spam Tools, [online] [retrieved Jul. 7, 2004] retrieved from http://home.nwoca.org, Ohio, U.S.A., Jul. 7, 2004.

Kularski, C. "Compound Procedures for Spam Control," Highland School of Technology, Gastonia, NC, U.S.A., Jan. 2004.

"Technical Responses to Spam," Nov. 2003, Taughannock Networks, Trumansburg, New York, U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

Cranor, Faith, L., LaMacchia, Brian A., "Spam!" Communications of the ACM, vol. 41, No. 8, pp. 74-83, Aug. 1998. U.S.A.

* cited by examiner

COUNTERING SPAM THROUGH ADDRESS COMPARISON

TECHNICAL FIELD

This invention pertains to the field of countering spam, i.e., unwanted electronic messages that are sent to a computer.

BACKGROUND ART

There are many ways to define spam. According to one definition, spam is any unwanted e-mail or other electronic message. According to another definition, spam is any unwanted electronic message from an unknown source. Suffice it to say that the problem of spam is serious and growing.

There are various techniques used, disclosed, and under development to help overcome the plague of spam. All these techniques have their advantages and disadvantages. As these techniques are being used in anti-spam products, spammers are innovating at their end to overcome these techniques. Another problem with anti-spam techniques is that there is always a chance of a false positive determination of spam, which can lead to serious difficulty. An e-mail or other electronic message that gets mis-categorized as spam may be an extremely important message, leading to user frustration and annoyance. Hence, it is important to avoid false positives wherever possible. The present invention addresses these issues, is effective at countering spam, and minimizes the false positive problem.

DISCLOSURE OF INVENTION

Computer implemented methods, apparati, and computer readable storage media for determining whether an electronic message (30) is likely to contain spam. A method embodiment of the present invention comprises the steps of comparing (11) addresses associated with the electronic message (30) with addresses in an address book (21) of a recipient (20) of the electronic message (30); counting (12) instances for which an address associated with the electronic message (30) matches an address in the address book (21); and determining (13) whether spam is likely present in the electronic message (30) by calculating whether a pre-selected condition (70) is satisfied, said pre-selected condition (70) being based upon a count of said matches and at least one predetermined threshold (80).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
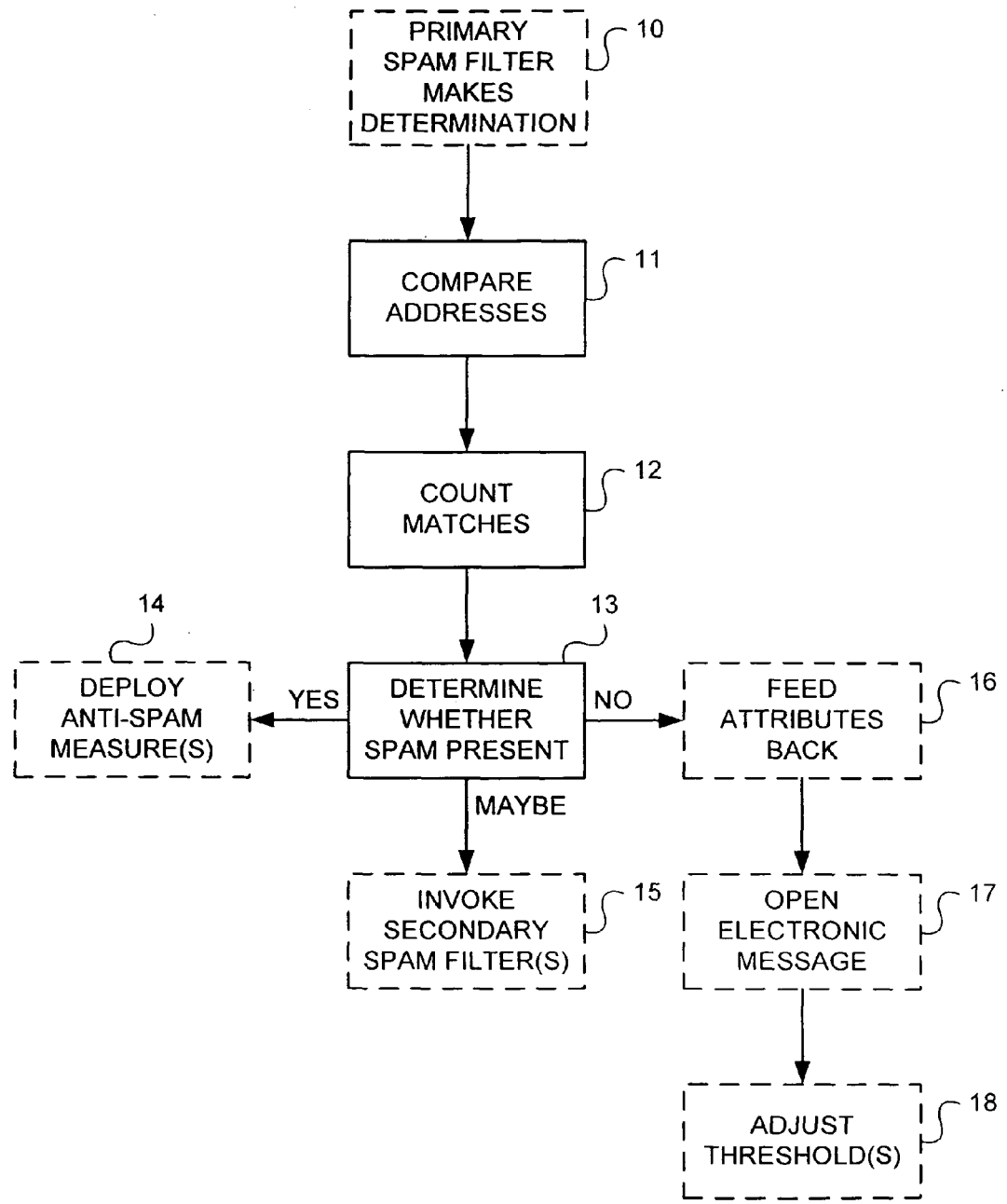
FIG. 1 is a flow diagram illustrating a method embodiment of the present invention.

FIG. 1 illustrates a method embodiment of the present invention. In optional step 10, a primary spam filter 40 makes a preliminary determination that spam is present in an electronic message 30 that has been sent to a recipient computer 20. The reason for optional step 10 is to invoke the inventive method only when a preliminary determination of spam has already been made. The reason for doing this is to avoid having to invoke the inventive method for each and every electronic message 30 that is sent to recipient computer 20. By so limiting use of the present invention, system resources can be conserved. When optional step 10 is employed, the present invention acts as a check to see whether primary spam filter 40 has made a false positive (FP) identification of spam. This invention should be executed after any anti-virus/anti-worm software has been executed.

Electronic message 30 can be any type of electronic message, such as an e-mail message following the SMTP protocol, a text message following the SMS protocol, or an instant message following the IMPP protocol.

At step 11, comparison module 23 compares addresses associated with the electronic message 30 with addresses in an address book 21 associated with recipient computer 20. In one embodiment, the addresses from electronic message 30 that are compared are addresses in TO and CC fields of the electronic message 30. The TO field contains one or more addresses of recipient computers to which the sender of electronic message 30 wishes to send the message 30. The CC field contains the addresses of recipient computers to which the sender of electronic message 30 wishes to copy the message 30 (CC stands for "carbon copy," a carryover from the days of yore when messages were composed by typing them using a typewriter).

In step 12, counting module 23 counts instances in which an address associated with the electronic message 30 matches an address stored in address book 21. Several different counts can be made by counting module 23. For example, module 23 can count nADR, nTO, xTO, nCC, and xCC. nADR is the number of addresses in address book 21. Said addresses may or may not include the address of recipient computer 20 itself. nTO is the total number of addresses in the TO field of message 30. xTO is the number of addresses that appear in both address book 21 and in the TO field. nCC is the total number of messages in the CC field of message 30. xCC is the number of addresses that appear in both address book 21 and in the CC field.

At step 13, determining module 24 makes a determination as to whether spam is likely present in electronic message 30. This determination is made by calculating whether a pre-selected condition 70 has been satisfied. Condition 70 is based upon the counts that have been made in step 12 and at least one predetermined threshold 80.

Pre-selected condition 70 can be any Boolean combination of test elements from the group of test elements consisting of: xTO/nADR>A; xCC/nADR>B; xTO/nTO>C; and xCC/nCC>D. A, B, C, and D are the predetermined thresholds 80 and are positive numbers. The Boolean combination can contain one, two, three, or all four of the test elements.

As an example, pre-selected condition 70 may be "xTO/nADR>0.5." When this condition 70 is satisfied, determining module 24 determines that spam is not present in electronic message 30, despite what primary spam filter 40 has concluded. Expressed in words, this condition 70 is "the number of addresses that appear in both the TO field and in address book 21 is greater than half of the total number of addresses in the address book."

In another example, condition 70 is "more than 40% of the addresses in the TO field appear in address book 21, AND more than 40% of the addresses in the CC field appear in address book 21." This condition 70 is a combination of the third and fourth test elements. When this condition 70 is satisfied, determining module 24 concludes that spam is not present in message 30, despite what primary spam filter 40 has previously concluded. The rationale for this determination is that, with such a high percentage of addresses in both the TO and the CC fields known to the user of recipient computer 20, as evidenced by these addresses being present in address book 21, the sender of message 30 knows a lot of the same people that the user of recipient computer 20 knows. This is an indication that message 30 can be trusted.

In an embodiment, determining step 13 can reach one of three conclusions: There is spam contained within message 30; there is no spam contained within message 30; or there might be spam contained within message 30. Which of these conclusions is chosen by determining module 24 can be based upon a pair of thresholds associated with the Boolean expression. As an example, if the Boolean expression calculates out to >0.9, determining module 24 concludes that there is no spam contained within message 30. If the Boolean expression calculates out to <0.1, determining module 24 concludes that there is spam contained within message 30. If the Boolean expression calculates out to within 0.1 and 0.9, inclusively, determining module 24 concludes that there might be spam contained within message 30.

After determining module 24 has made its determination, control can be passed to optional post-determination module 25 for further processing. For example, if determining module 24 has determined at step 13 that spam is contained within message 30, post-determination module 25 can execute optional step 14, deployment of anti-spam measures. These measures can include, for example, deletion of message 30 from the inbox of computer 20, reporting the event to a system administrator or to the user of computer 20 via display 26, sending the offending message 30 to an anti-spam research center, putting the sending address associated with message 30 onto a blacklist, etc.

If determining module 24 has determined in step 13 that spam might be present within message 30, post-determination module 25 can, at optional step 15, invoke one or more secondary spam filters 50 to conduct a more thorough investigation as to whether or not spam is present within message 30. Each of the secondary spam filters 50 should be different than primary spam filter 40, because it is already known that, in those embodiments where primary spam filter 40 has been employed, filter 40 has already concluded that, in its opinion, spam is present within message 30. It might be too costly in terms of system resources for these filters 50 to be invoked for each and every message 30.

If determining module 24 has determined at step 13 that there is no spam contained within message 30, post-determination module 25 can perform one or more of the following optional steps:

At optional step 16, post-determination module 25 feeds attributes of message 30 back to primary spam filter 40 in those embodiments where filter 40 has been employed. This helps to train filter 40 for future use. Attributes of message 30 that can be fed back include some or all of the contents of message 30, at least one address from the TO field of message 30, and at least one address from the CC field of message 30. The attributes can also be fed back to filter 40 at the end of step 15, if the filters 50 in step 15 conclude that no spam is present.

At optional step 17, post-determination module 25 opens message 30 so the user of computer 20 can verify whether spam is present in message 30 or not. The risk of opening up message 30 is mitigated by the fact that a preliminary determination has been made by determining module 24 that spam is not present within message 30.

At optional step 18, when the result of step 17 is that spam is actually present in message 30 after all (i.e., determining means 24 has made a false negative), post-determination module 25 (or the user) adjusts one or more of the predetermined thresholds 80. The rationale for such an adjustment is that the determination of no spam being present was a false negative and therefore it is desirable to tighten up the criteria for a declaration of no spam by means of raising one or more of the thresholds 80. As part of step 18, the fact of the false negative being made can be fed back to filter 40 as part of its training.

Figure 2:
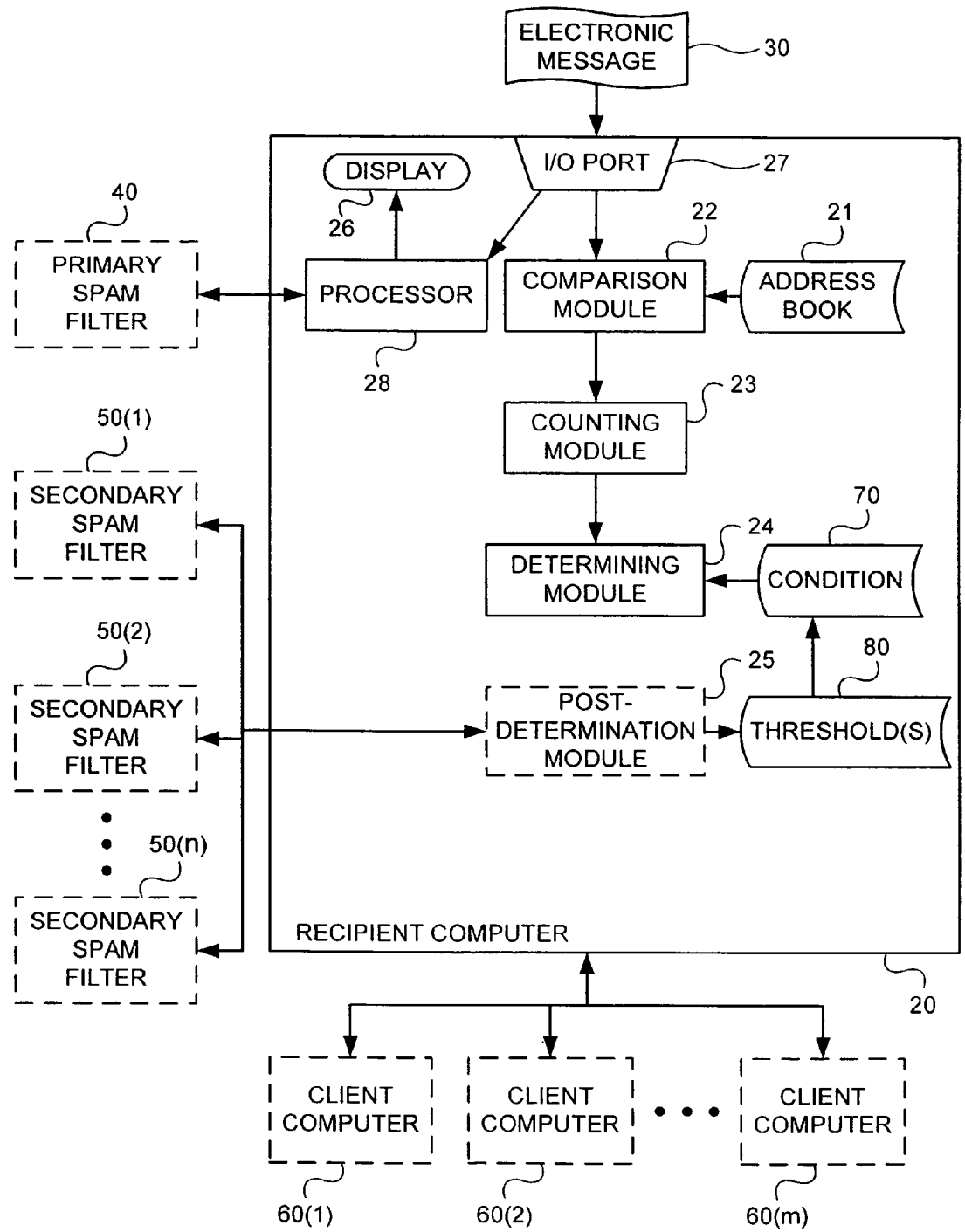
FIG. 2 is a block diagram illustrating an apparatus embodiment of the present invention.

FIG. 2 illustrates apparatus suitable for carrying out the present invention. Recipient computer 20 has associated therewith address book 21. Computer 20 may include a display 26 for conveying information to the user of computer 20. Modules 22 through 25 may be contained within computer 20 or may be physically separated from computer 20 but coupled thereto. Modules 22 through 25 may be implemented in software, firmware, hardware, or any combination thereof. When modules 22 through 25 are implemented in software, they may reside on a computer readable storage medium or media such as one or more hard disks, compact disks, DVDs, floppy disks, etc., in the form of computer programming instructions.

Electronic message 30 is conveyed to computer 20 via an input/output port 27 of computer 20. Coupled to computer 20 may be primary spam filter 40 and/or one or more secondary spam filters 50. Processor 28 executes the instructions from filter 40, and can also assist modules 22-25 in performing their functions.

Pre-selected conditions 70 can be stored in the form of logic on a memory module 70 that is coupled to determining module 24. Predetermined thresholds 80 may be stored on a memory module 80 that is coupled to module 70 and to module 25. Modules 70 and 80 can be embodied in any combination of software, firmware, and/or hardware.

Recipient computer 20 may be a server computer coupled to one or more client computers 60. This architecture is particularly useful in a groupware (such as LotusNotes) environment, because it is more efficient to run the inventive method just one time at the server 20 level rather than many times, one for each client computer 60. In this embodiment, server computer 20 is aware of a user address book associated with each of the client computers 60.

As can be seen from the above-discussion, the present invention offers many advantages over the prior art. For example, if this invention causes a false positive, the adverse consequences are not too great, because there has already been a false positive declared by primary spam filter 40. If, on the other hand, this invention causes a false negative, the user of computer 20 or, alternatively, post-determination module 25, can adjust the thresholds 80 and/or give feedback to the primary spam filter 40.

The above description is included to illustrate the operation of the preferred embodiments and is not meant to limit the scope of the invention. The scope of the invention is to be limited only by the following claims. From the above discussion, many variations will be apparent to one in skilled in the art that would yet be encompassed by the spirit and scope of the present invention.

What is claimed is:

1. A computer-implemented method for determining whether an electronic message sent by a sender to a message recipient and to other recipients contains spam, the electronic message received on a recipient computer, said method comprising the steps of:

comparing electronic message addresses of the other recipients listed in a TO field and a CC field of the electronic message with electronic message addresses stored in an address book of the message recipient, wherein the recipient computer consists of a client computer or a server computer coupled to a plurality of client computers, and wherein the recipient computer has access to the address book;

counting instances for which each of the electronic message addresses of the other recipients listed in the TO field and the CC field of the electronic message matches an electronic message address stored in the address book;

calculating whether at least three of the following conditions are satisfied: 1) xTO/nADR>A, 2) xCC/nADR>B, 3) xTO/nTO>C, and 4) xCC/nCC>D, where A, B, C, and D are thresholds that are pre-selected numbers, wherein each of the pre-selected numbers is a percentage, and where nADR is a total number of addresses in the address book, where xTO is a number of addresses in the address book that are also contained in the TO field of the electronic message, where xCC is a number of addresses in the address book that are also contained in the CC field of the electronic message, where nTO is a total number of addresses in the TO field, and where nCC is a total number of addresses in the CC field, wherein the xTO and xCC are obtained or calculated based on said counting;

responsive to at least three of the conditions 1), 2), 3), and 4) being satisfied, determining that the electronic message is non-spam, wherein, prior to the comparing step, a spam filter determined that the electronic message is spam, and wherein the comparing, counting, calculating, and determining steps are a check on whether the spam filter made a false positive identification of spam and wherein the comparing, the counting, the calculating and the determining are performed by the client computer or the server computer coupled to a plurality of client computers.

2. The method of claim 1 wherein attributes from the electronic message are fed back to the spam filter to train the spam filter regarding attributes of non-spam electronic messages for future use in spam detection.

3. The method of claim 2 wherein the attributes comprise at least one of:
   contents of the electronic message;
   at least one address from the TO field associated with the electronic message; and
   at least one address from the CC field associated with the electronic message.

4. The method of claim 1 wherein the determination is verified by the message recipient opening the electronic message and determining whether or not the message contains spam.

5. The method of claim 4 wherein, when the conclusion of the message recipient opening the message is that spam is contained within the electronic message, at least one of the thresholds of the conditions is adjusted based on this false negative for tightening criteria associated with a determination that no spam is present.

6. The method of claim 1, wherein the electronic message is determined to be non-spam only in response to all of the conditions 1), 2), 3), and 4) being satisfied.

7. At least one non-transitory computer-readable storage medium encoding computer program instructions executable on a processor for determining whether an electronic message sent by a sender to a message recipient and to other recipients contains spam, the electronic message received on a recipient computer, said computer program instructions performing the steps of:
   comparing electronic message addresses of the other recipients listed in a TO field and a CC field of the electronic message with electronic message addresses stored in an address book of the message recipient, wherein the recipient computer consists of a client computer or a server computer coupled to a plurality of client computers, and wherein the recipient computer has access to the address book;

counting instances for which each of the electronic message addresses of the other recipients listed in the TO field and the CC field of the electronic message matches an electronic message address stored in the address book;

calculating whether at least three of the following conditions are satisfied: 1) xTO/nADR>A, 2) xCC/nADR>B, 3) xTO/nTO>C, and 4) xCC/nCC>D, where A, B, C, and D are thresholds that are pre-selected numbers, wherein each of the pre-selected numbers is a percentage, and where nADR is a total number of addresses in the address book, where xTO is a number of addresses in the address book that are also contained in the TO field of the electronic message, where xCC is a number of addresses in the address book that are also contained in the CC field of the electronic message, where nTO is a total number of addresses in the TO field, and where nCC is a total number of addresses in the CC field, wherein the xTO and xCC are obtained or calculated based on said counting;

responsive to at least three of the conditions 1), 2), 3), and 4) being satisfied, determining that the electronic message is non-spam, wherein, prior to the comparing step, a spam filter determined that the electronic message is spam, and wherein the comparing, counting, calculating, and determining steps are a check on whether the spam filter made a false positive identification of spam.

8. The at least one non-transitory computer-readable storage medium of claim 7 wherein attributes from the electronic message are fed back to the spam filter to train the spam filter regarding attributes of non-spam electronic messages for future use in spam detection.

9. The at least one non-transitory computer-readable storage medium of claim 8 wherein the attributes comprise at least one of:
   contents of the electronic message;
   at least one address from the TO field associated with the electronic message; and
   at least one address from the CC field associated with the electronic message.

10. The at least one non-transitory computer-readable storage medium of claim 7 wherein the determination is verified by the message recipient opening the electronic message and determining whether or not the message contains spam.

11. The at least one non-transitory computer-readable storage medium of claim 10 wherein, when the conclusion of the message recipient opening the message is that spam is contained within the electronic message, at least one of the thresholds of the conditions is adjusted based on this false negative for tightening criteria associated with a determination that no spam is present.

12. The at least one computer-readable storage medium of claim 7, wherein the electronic message is determined to be non-spam only in response to all of the conditions 1), 2), 3), and 4) being satisfied.

13. A computer system for determining whether an electronic message that has been sent by a sender to a message recipient and to other recipients contains spam, the electronic message received on a recipient computer, said computer system comprising:

a non-transitory computer-readable storage medium storing executable software modules, comprising:
  a comparison module associated with the recipient computer adapted to compare electronic message addresses of the other recipients listed in a TO field and a CC field of the electronic message with electronic message addresses stored in an address book of the message recipient, wherein the recipient computer consists of a client computer or a server computer coupled to a plurality of client computers, and wherein the recipient computer has access to the address book;
  coupled to the comparison module, a counting module adapted to count instances for which each of the electronic message addresses of the other recipients listed in the TO field and the CC field of the electronic message matches an electronic message address stored in the address book;
  coupled to the counting module, a determining module adapted to:
    calculate whether at least three of the following conditions are satisfied: 1) $xTO/nADR>A$, 2) $xCC/nADR>B$, 3) $xTO/nTO>C$, and 4) $xCC/nCC>D$, where A, B, C, and D are thresholds that are pre-selected numbers, wherein each of the pre-selected numbers is a percentage, and where nADR is a total number of addresses in the address book, where xTO is a number of addresses in the address book that are also contained in the TO field of the electronic message, where xCC is a number of addresses in the address book that are also contained in the CC field of the electronic message, where nTO is a total number of addresses in the TO field, and where nCC is a total number of addresses in the CC field, wherein the xTO and xCC are obtained or calculated based on said counting; and
    responsive to at least three of the conditions 1), 2), 3), and 4) being satisfied, determining that the electronic message is non-spam, wherein, prior to the comparing step, a spam filter determined that the electronic message is spam, and wherein the comparing, counting, calculating, and determining steps are a check on whether the spam filter made a false positive identification of spam; and
  a processor configured to execute the software modules stored by the non-transitory computer-readable storage medium.

14. The system of claim 13, wherein the electronic message is determined to be non-spam only in response to all of the conditions 1), 2), 3), and 4) being satisfied.

15. The system of claim 13, further comprising a post-determination module, coupled to the determining module, the post-determination module adapted to feed attributes of the electronic message back to the spam filter to train the spam filter for future use.

* * * * *